United States Patent
Buchner et al.

(10) Patent No.: US 6,299,999 B1
(45) Date of Patent: Oct. 9, 2001

(54) INTERMEDIATE ELEMENT FOR THERMAL, ELECTRICAL AND MECHANICAL CONNECTION OF TWO PARTS

(75) Inventors: Peter Buchner, Heiligenstadt; Rittmar Von Helmolt, Erlangen; Georg Neumann, Roth; Horst Grüne, Röttenbach, all of (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/254,357
(22) PCT Filed: Aug. 22, 1997
(86) PCT No.: PCT/DE97/01827
 § 371 Date: Mar. 4, 1999
 § 102(e) Date: Mar. 4, 1999
(87) PCT Pub. No.: WO98/10477
 PCT Pub. Date: Mar. 12, 1998

(30) Foreign Application Priority Data

Sep. 4, 1996 (DE) .............................. 196 35 901

(51) Int. Cl.⁷ .................................................. H01M 8/02
(52) U.S. Cl. .................. 429/34; 429/12; 429/26
(58) Field of Search ................... 429/34, 12, 26, 429/18, 38, 39, 604; 428/596

(56) References Cited

U.S. PATENT DOCUMENTS 1,899,080   2/1933   Dalgliesh .

FOREIGN PATENT DOCUMENTS

| 42 25 779 A1 | 8/1992 | (DE) . | |
| 0 129 272 | 5/1983 | (EP) . | |
| WO 91/08595 | 11/1989 | (EP) . | |
| 0 446 680 A1 | 3/1990 | (EP) . | |
| 91/08595 | * 6/1991 | (EP) | ........... 8/2 |
| 62-278758 | 12/1987 | (JP) . | |
| 1-117275 | 5/1989 | (JP) . | |
| 1-279573 | 11/1989 | (JP) . | |

\* cited by examiner

Primary Examiner—Gabrielle Brouillette
Assistant Examiner—M. Wills
(74) Attorney, Agent, or Firm—Schiff Hardin & Waite

(57) ABSTRACT

The invention is directed to an intermediate element for thermal, electrical and mechanical connection of two parts, particularly two fuel cells. The intermediate element is corrugated and each corrugation is respectively multiply interrupted along its wave hill/wave valley and is coined upward and downward in alternation.

16 Claims, 1 Drawing Sheet

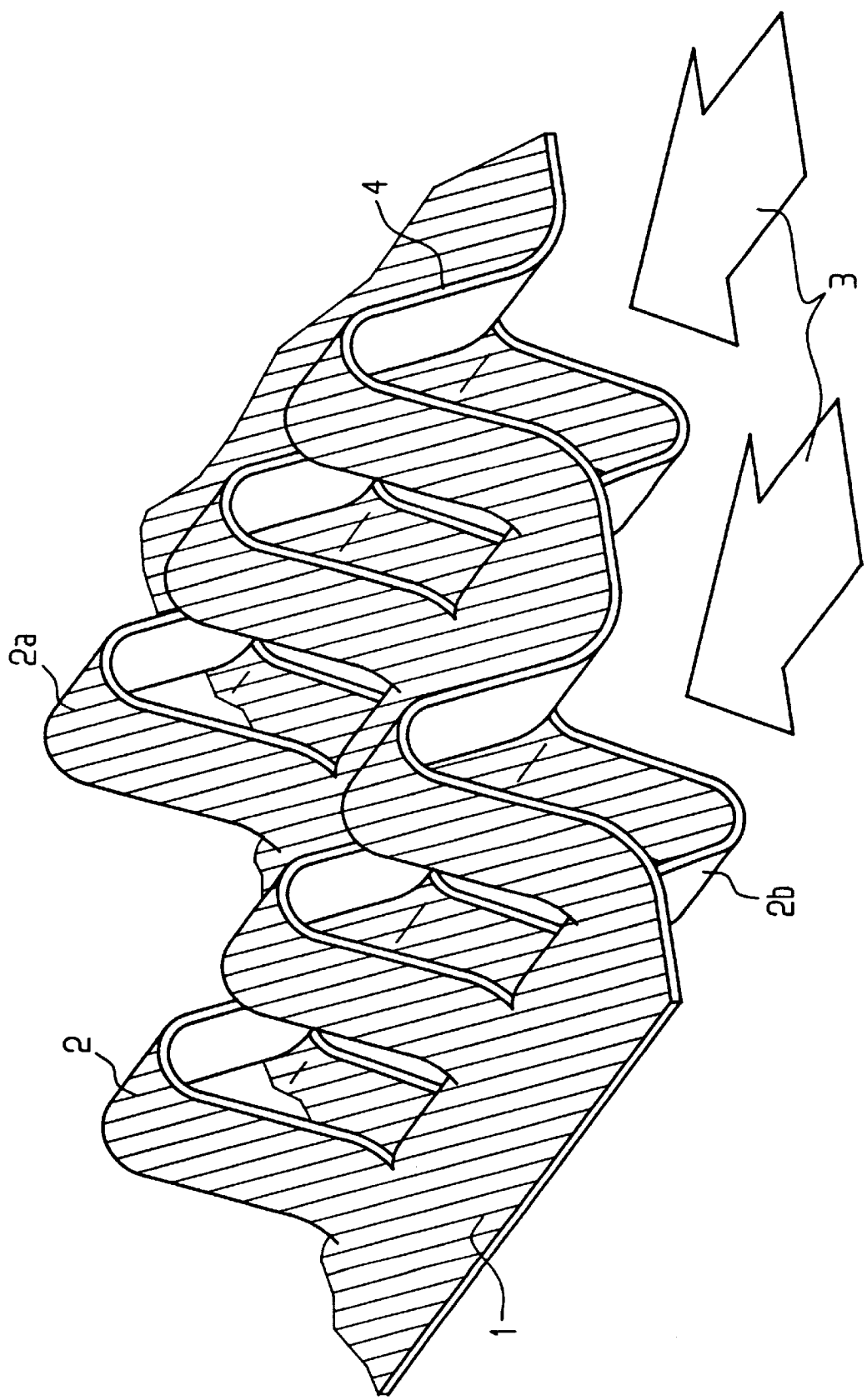

INTERMEDIATE ELEMENT FOR THERMAL, ELECTRICAL AND MECHANICAL CONNECTION OF TWO PARTS

FIELD OF THE INVENTION

The invention is directed to an intermediate element for thermal, electrical and mechanical connection of two parts, particularly two fuel cells.

BACKGROUND OF THE INVENTION

For example, bipolar plates are known for the electrical, thermal and mechanical connection of fuel cells, whereby these bipolar plates are fashioned continuous, i.e. without holes or clearances, so that a reaction medium that flows along the active surface of a bipolar plate can be located either above or below this plate according to the Prior Art. All other known intermediate elements that are not bipolar plates respectively use only one surface for the contact with the medium.

The continuous fashioning of the bipolar plates also has the disadvantage that the cooling or reaction medium is conducted over the active surface in a flow without an exchange of the medium occurring from the middle of the flow to the outer region of the flow. When the medium at the outside of the flow has been used, it cannot be replaced by unused reaction agent proceeding from the middle of the flow but must be replaced by new agent located at the outside of the flow, so that, to be brief, a high flow velocity of agent is required given optimally small agent flow diameters. It is thereby disadvantageous that, even given small agent flow diameters, the part of the agent that is in the middle of the flow always flows through the system unused.

Finally, the known bipolar plates or intermediate elements exhibit the disadvantage that the pressure transmission occurs non-uniform, namely with peak loads at the highest elevations of the bipolar plates.

The known bipolar plates and/or intermediate elements thus not only lack a possibility of effecting an exchange of the agent from the middle of the agent flow toward the outside of the flow within the agent flow on their active surface, a possibility of using the surface present at both sides (and, for example, effective in the cooling system) for contacting with agent but also lack the capability of forwarding mechanical pressure as uniformly as possible across their entire surface.

There is thus a need for bipolar plates that, just like the known bipolar plates, can be utilized as electrically, mechanically and thermally connecting intermediate elements in fuel cell stacks and that simultaneously reduce or entirely eliminate the aforementioned disadvantages.

SUMMARY OF THE INVENTION

It is therefore an object of the present invention to make an intermediate element or a bipolar plate available that is fashioned such that an exchange of the agent toward the outside regions from the middle of the agent flow is possible on its active surface. It is also an object of the invention to create an intermediate element that uniformly transfers the mechanical pressure. Finally, another object of the invention is to optimize the actively used surface of intermediate elements.

A general perception of the invention is that, due to the fashioning of sharp edges along the active surface of the intermediate element of the bipolar plate, the agent experiences turbulence when it flows along the active surface that effects an exchange of agent from the middle of the agent stream or flow toward the outer regions. It is also a general perception of the invention that the active surface of a bipolar plate can be multiplied by the formation of holes and clearances given the same outlay for material. Finally, it has been recognized in the framework of the invention that a plurality of elevations and depressions on an intermediate element leads to a uniform pressure transmission.

The subject matter of the invention is a corrugated intermediate element for thermal, mechanical and electrical connection of two parts, whereby each corrugation is multiply interrupted along its wave hill of wave valley and is coined upward and downward in alternation.

The intermediate element is preferably made of a material with good thermal and electrical conductivity that also comprises suitable elastic properties for the transmission of mechanical pressure.

In a preferred embodiment, the intermediate element is made of a metal such as, for example, spring bronze or other copper or aluminum alloys. For reducing the contact resistance in the formation of a "stack", i.e. of a fuel cell stack, for example of a battery, the inventive intermediate elements can be subject to a surface treatment before their incorporation such as, for example, a gold plating. Such a surface treatment is usually implemented for improving the electrical and thermal conductivity of bipolar plates.

The thickness of the intermediate elements can amount to up to 0.5 mm; it preferably amounts to between 0.001 and 0.4 mm, and intermediate elements with a thickness of approximately 0.05 are especially preferred.

What are referred to here as "corrugated intermediate element" or "corrugated bipolar plate" are flat, thermally, mechanically and electrically conductive plates, sheets, disks or other, more planarly fashioned bodies that exhibit a corrugated structure similar to a corrugated sheet. The height of the wave hills or, respectively, the difference of the heights between wave hill and wave valley are thereby arbitrary and correspond to the standard dimensions of intermediate elements, particularly those that are utilized in fuel cell stacks.

What are referred to as "individual interruption of the corrugation along its wave hill or wave valley" are the clearances that enable the fashioning of individual lamellae bent down and up in alternation that are bent out similar to blades. The term "blades" can thereby refer to "bent out portions" rounded off at the top as well as pointed at the top up to entirely pointed (labeled 2, 2a and 2b in FIG. 1).

What is achieved as a result of this simple design measure of the aforementioned interruptions is that the agent can flow not only either above or below the intermediate element; rather, it is thus possible to simultaneously conduct the agent at the top and bottom along the intermediate element. The surface of the intermediate element is thereby substantially increased, i.e. up to a factor of more than 10. As a result of enlarging the surface, the "active surface", i.w., for example, the contact surface that is available for the thermal contact of the bipolar plate with the coolant, is also increased. That serves to increase the efficiency of the affected system.

By coining the lamellae—upward and downward in alternation—, edges are created along a corrugation, so that the agent stream or flow flowing along experiences turbulence. What is here referred to as "agent stream" is the flow or stream of the reaction agent respectively under consideration (for example, the coolant) that flows along the active surface of an intermediate element or of a bipolar plate that is relevant to it and thereby reacts in conformity with the system or is consumed or is heated.

Both the enlargement of the active surface of the intermediate element as well as the creation of turbulence in the agent stream of the coolant or reaction agent improve the efficiency, i.e. the effective utilization of the agent in the system.

A further advantage of the inventive design of the intermediate elements with respect to the pressure transmission is that the alternating coining of the lamellae toward the top and bottom effects that the pressure is uniformly transmitted from one part to the next, for example from one fuel cell to the next.

Any type of coolant such as, for example, air, inert gas, other gasses or fluids is referred to here as coolant. However, the coolant air or some other gaseous coolant is preferably inventively employed.

The invention is applicable to all types of fuel cells, but preferably to the PEM (polymer electrolyte membrane) fuel cell. In particular, the manufacture of fuel cell stacks or "stack" of PEM fuel cells that are operated with air cooling (air-cooled PEM batteries) was taken into consideration in this invention.

In an embodiment, the present invention provides an intermediate element for connecting two fuel cells that comprises a plurality of upward lamellae and a plurality of downward lamellae. Each upward lamella is disposed between two downward lamellae. Each lamella comprises first and second opposing ends. The first ends of the lamellae are connected togethr and the second ends of the lamellae are connected together. Each lamella further comprises at least one valley section disposed between two hill sections. The hill sections of the upward lamellae extend outward away from their respective valley section in a first direction and each hill section of the downward lamellae extend outward from their respective valley section in a second direction opposite to the first direction so that the element comprises alternating upward and downward lamellae that feature alternating upward and downward hill sections as illustrated in FIG. 1.

In an embodiment, the valley sections are generally coplanar with the first and second ends.

In an embodiment, the valley sections are both generally coplanar with the first and second ends and further, the valley sections are connected together.

Other objects and advantages of the present invention will become apparent from reading the following detailed description and appended claims, and upon reference to the accompanying drawing.

BRIEF DESCRIPTION OF THE DRAWING

The invention is explained below further on the basis of a schematic sketch.

In the Drawing

FIG. 1 is a perspective view of an intermediate element made in accordance with the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY

PREFERRED EMBODIMENTS

FIG. 1 shows the intermediate element 10 with a structure similar to corrugated sheet, whereby the individual corrugations are multiply interrupted along their wave hill and the lamellae 2 thereby being formed toward the top in the one instance as shown, for example, at 2a and toward the bottom in another instance as shown, for example, at 2b. Between the hills, either the upwardly protruding hills 2a of so-called upward lamellae 2 or the downwardly protruding hills 2b of the so-called downward lamellae 2 are disposed valley sections shown generally at 5. The valley sections 5 of the individual lamella 2 are connected together in the embodiment 10 illustrated in FIG. 1. Further, it will be noted that each lamella 2 includes at least one valley section 5 disposed between two hill sections 2a or 2b. It will also be noted that each lamella 2 is attached to opposing ends 11, 12 which, in the embodiment illustrated in FIG. 1, are connected together for structural integrity as are the valley sections 5. The agent stream of coolant or reaction agent flows onto the active surface of the intermediate element along the direction that is indicated by the arrows 3 and can flow both between the individual corrugations along the surface of the intermediate element that is continuous and shown hatched as well as through the channels (not closed) formed by the individual lamellae of the corrugations. It is thereby obvious that especially more surface of the intermediate element 10 is available to the agent than according to a traditional, non-interrupted design of a bipolar plate because it contacts not only the surface of the intermediate element shown hatched but also the original underside (shown non-hatched) of the bipolar plate or intermediate element over broad areas.

It can be seen just as clearly that each lamella forms two edges that reside transverse to the flow direction. Turbulence of the agent stream then occurs at these edges, this leading thereto that agent from the middle of the stream proceeds into the outer regions of the agent stream and used and unused agent are thus being constantly exchanges within the agent stream. It is thereby possible to clearly reduce the need for agent.

The inventive intermediate elements with the interrupted corrugated sheet structure, moreover, are especially well-suited for transmitting high mechanical pressure (when, on the basis of a corresponding corrugation of the collector, the intermediate element is fixed by the pressing of the cell stack) because a more uniform pressure transfer is possible due to the individual lamellae. The intermediate element thereby need not be separately secured to the adjacent collectors of the individual fuel cells.

The inventive intermediate element is suited for unproblematically transmitting mechanical pressure and electrical current between individual fuel cells of a fuel cell stack, and is also suited for optimally assuring the elimination of the dissipated heat from the collector of the fuel cell to the coolant such as, for example, cooling air that flows through. Inventively, the contact surface of the intermediate element is thereby more than 10 times larger than the electrode surface, and the utilization of the reaction agent located on the active surface of the intermediate element is also optimized.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed:

1. An intermediate element for connecting two fuel cells, the element comprising:
   a plurality of upward lamellae and a plurality of downward lamellae, each upward lamellae being disposed between two downward lamellae,
   each lamella comprising first and second opposing ends, the first ends of the lamellae being connected together, the second ends of the lamellae being connected together,
   each lamella comprising at least one valley section disposed between first and second hill sections, each first hill section being disposed between their respective valley section and its respective first end, each second hill section being disposed between their respective valley section and its respective second end,
   each hill section of the upward lamellae extending outward away from its respective valley section in a first direction, each hill section of the downward lamellae extending outward from its respective valley section in a second direction opposite to the first direction.

2. The element of claim 1 wherein the valley sections are generally coplanar with the first and second ends.

3. The element of claim 1 wherein the valley sections are connected together.

4. The element of claim 1 wherein the valley sections are generally coplanar with the first and second ends and the valley sections are connected together.

5. The intermediate element of claim 1 wherein the element connects two air-cooled fuel cells.

6. The intermediate element of claim 1 wherein the element if fabricated from a spring sheet of a material selected from the group consisting of bronze, a copper alloy and an aluminum alloy.

7. The intermediate element of claim 1 wherein the element connects two fuel cells of a stack of fuel cells.

8. The intermediate element of claim 7 wherein the stack of fuel cells is a stack of air-cooled fuel cells.

9. An assembly of a stack of fuel cells comprising a plurality of fuel cells arranged in a stack, each fuel cell being connected to at least one adjacent fuel cell by an intermediate element, each intermediate element comprising a sheet having at least two rows of a plurality of upwardly curved lamellae and a plurality of downwardly curved lamellae, each upwardly curved lamellae of each row being disposed between two downwardly curved lamellae of the row, said lamellae having first and second opposing ends with the first ends of the lamellae of each row being connected together and the second ends of the lamellae of each row being connected together, and the second ends of one row being connected to first ends of a next adjacent row to form a valley section between two adjacent rows.

10. The assembly of claim 9 wherein the fuel cells are air-cooled fuel cells.

11. The assembly of claim 9 wherein the elements are fabricated from a spring sheet of a material selected from the group consisting of bronze, a copper alloy and an aluminum alloy.

12. An assembly according to claim 9, wherein edges of the sheets and the valley sections are generally lying in a plane and the upwardly curved lamellae extending from one side of said plane and the downwardly curved lamellae extending from the opposite side of said plane.

13. An intermediate element for connecting two fuel cells, sad element comprising a sheet having a plurality of rows, each row having a plurality of upwardly curved lamellae and a plurality of downwardly curved lamellae, each of the upwardly curved lamellae of a row being disposed between two downwardly curved lamellae of the row, all of said lamellae having first ends and second ends with the first ends of the lamellae of each row being connected together and the second ends of the lamellae of each row being connected together and being connected together to the first ends of the lamellae of a next adjacent row to form a valley section between two adjacent rows.

14. An intermediate element according to claim 13, wherein the valley sections generally lie in a plane which includes the edges of said sheet, the upwardly curved lamellae extend from one side of said plane, and the downwardly curved lamellae extend from the opposite side of said plane.

15. An intermediate element according to claim 13, wherein the element connects two air-cooled fuel cells.

16. An intermediate element according to claim 13, wherein the sheet is a sheet of spring material selected from a group consisting of bronze, a copper alloy and an aluminum alloy.

* * * * *